United States Patent
Oh et al.

(10) Patent No.: US 8,663,788 B2
(45) Date of Patent: Mar. 4, 2014

(54) ORGANIC-INORGANIC HYBRID TRANSPARENT HYDROGEL COMPLEX FOR FIRE RETARDANT GLASS, FIRE RETARDANT GLASS ASSEMBLY USING THE SAME, AND MANUFACTURING METHOD THEREOF

(75) Inventors: Jae-Hwan Oh, Gyeongsangnam-Do (KR); Myungjin Choi, Busan (KR)

(73) Assignee: Samgong Co., Ltd., Busan (KR)

( * ) Notice: Subject to any disclaimer, the term of this patent is extended or adjusted under 35 U.S.C. 154(b) by 629 days.

(21) Appl. No.: 12/846,408

(22) Filed: Jul. 29, 2010

(65) Prior Publication Data

US 2011/0135896 A1   Jun. 9, 2011

(30) Foreign Application Priority Data

Dec. 7, 2009   (KR) .................. 10-2009-0120588

(51) Int. Cl.
*B32B 7/02* (2006.01)

(52) U.S. Cl.
USPC ........... 428/215; 524/145; 428/339; 428/410; 156/107; 516/55; 252/609; 252/610; 252/611; 252/183.13; 52/232

(58) Field of Classification Search
USPC ............. 428/215, 339, 410; 52/232; 252/609, 252/610, 611, 183.13; 501/12; 516/55, 111; 523/179; 524/916
See application file for complete search history.

(56) References Cited

U.S. PATENT DOCUMENTS

| | | | | |
|---|---|---|---|---|
| 4,097,422 A | * | 6/1978 | Markusch | 521/154 |
| 4,636,440 A | * | 1/1987 | Jada | 428/446 |
| 4,830,913 A | * | 5/1989 | Ortmans et al. | 428/34 |
| 4,873,146 A | | 10/1989 | Toussaint et al. | |
| 5,061,748 A | | 10/1991 | Bolton et al. | |
| 5,391,442 A | * | 2/1995 | Tsushima et al. | 430/7 |
| 5,565,273 A | | 10/1996 | Egli et al. | |
| 5,653,839 A | * | 8/1997 | Itoh et al. | 156/109 |
| 6,379,825 B1 | | 4/2002 | Goelff et al. | |
| 8,258,226 B2 | * | 9/2012 | Fujita | 524/406 |
| 2002/0013412 A1 | * | 1/2002 | Saito et al. | 525/100 |
| 2003/0004247 A1 | * | 1/2003 | Destandau et al. | 524/437 |
| 2010/0189993 A1 | * | 7/2010 | Mori et al. | 428/317.5 |
| 2010/0229483 A1 | * | 9/2010 | Griffiths | 52/232 |

FOREIGN PATENT DOCUMENTS

| | | | |
|---|---|---|---|
| JP | 63-160833 A | | 7/1988 |
| JP | 04-227048 A | | 8/1992 |
| JP | 06-305785 A | | 11/1994 |
| KR | 10-1994-0006953 | | 4/1994 |
| WO | WO 2006/137560 | * | 12/2006 |
| WO | WO 2008/136317 | * | 11/2008 |

* cited by examiner

*Primary Examiner* — Maria Veronica Ewald
*Assistant Examiner* — Brian Handville
(74) *Attorney, Agent, or Firm* — Frommer Lawrence & Haug LLP; Ronald R. Santucci

(57) ABSTRACT

The present invention relates to an organic-inorganic hybrid transparent hydrogel complex containing a polymerizable acrylic monomer, a metal alkoxide sol solution, a water-soluble salt, a phosphorus compound, a silane coupling agent, a quaternary ammonium salt, a polymerization initiator, and water. Moreover, the present invention provides a fire retardant glass assembly using the organic-inorganic hybrid transparent hydrogel complex and a manufacturing method thereof.

The organic-inorganic hybrid transparent hydrogel complex according to the present invention has excellent properties such as long-term transparency, flame-retardancy, thermal insulation, long-term durability, and weather resistance, and thus it can be suitably used as a fire retardant material for fire retardant glass.

18 Claims, No Drawings

ORGANIC-INORGANIC HYBRID TRANSPARENT HYDROGEL COMPLEX FOR FIRE RETARDANT GLASS, FIRE RETARDANT GLASS ASSEMBLY USING THE SAME, AND MANUFACTURING METHOD THEREOF

CROSS-REFERENCE TO RELATED APPLICATION

This application claims the benefit of Korean Patent Application No. 10-2009-0120588, filed on Dec. 7, 2009, the entire disclosure of which is hereby incorporated by reference.

BACKGROUND OF THE INVENTION

1. Field of the Invention

The present invention relates to an organic-inorganic hybrid transparent hydrogel complex for fire retardant glass, a fire retardant glass assembly using the same, and a manufacturing method thereof.

2. Description of Related Art

Fire retardant glass is used to prevent flames from spreading to the interior of a building in the event of a fire.

In general, a fire retardant glass consists of at least two panes of glass and a fire retardant material interposed therebetween. Examples of fire retardant glass include float glass and tempered glass. The float glass is vulnerable to external impact, while the tempered glass provides the required transparency, but it cannot provide the required functionalities to cope with external environments.

Suitable fire retardant materials for the fire retardant glass should have excellent fire retardancy and external appearance. That is, fire retardancy depends on the rate of evaporation of water contained in the fire retardant material and the fire retardant material's capacity to form an insulating layer when it is exposed to the flame. Therefore, in order to achieve the required fire retardancy, the fire retardant material must have high water content and preserve the insulating layer formed during heating. Moreover, it should have excellent adhesion with glass and self-supporting performance. Furthermore, with regard to the appearance, it should have a transparency like a pane of glass and have no optical distortion of objects. In addition, it should have high physical and chemical properties such as excellent low-temperature and high-temperature stability and no discoloration by light.

Conventional resin compositions used as a fire retardant material include organic polymer hydrogels and inorganic silicate hydrogels. The organic polymer hydrogel is advantageous in that it has higher water content than the inorganic hydrogel, but it is disadvantageous in that it is easily decomposed by heat. To overcome the disadvantage, there has been an attempt to thicken the resin layer, but it is difficult to ensure a homogeneous reaction due to increased thickness of the resin layer. Further, if the resin layer becomes thick, it may cause optical distortion so that an object at the opposite side of the fire retardant glass may be seen as distorted by a heterogeneous reaction of the resin layer. Moreover, when the organic polymer hydrogel is exposed to flame, its local temperature may be increased by the heterogeneous reaction inside the resin layer. Meanwhile, since the inorganic hydrogel contains an inorganic material and has low water content, it has drawbacks that the temperature at the opposite side is considerably increased at the initial stage of heating. Further, the unit production cost is very high because the raw material is expensive and has high solid content. Besides, since the viscosity of the resin composition is high and the stability at room temperature is low, it requires special care and equipment, and the manufacturing process is complex.

Examples of such fire retardant glass assemblies using resin compositions are disclosed in U.S. Pat. No. 4,830,913 and Korean Patent Publication No. 1996-0005270. Such fire retardant glass assemblies are generally manufactured by filling a resin composition between at least two glass plates separated by spacers. Here, it is necessary to easily inject the resin composition into the space formed by the glass plates regardless of the thickness and shape of the space.

As typical examples of the resin compositions used as the fire retardant materials, U.S. Pat. No. 4,830,913 discloses a resin composition comprising a water-soluble salt, an acrylic monomer, water, and an anticorrosive compound, and U.S. Patent Application No. 2003/0004247 discloses a resin composition comprising a water-soluble salt, an acrylic monomer, and a cross-linkable fire retardant agent.

However, each of the above-described resin compositions contains an organic polymer as a main component, and thus the fire retardancy is reduced compared to the hydrogel containing an inorganic material as a main component, and the resin layer should have a large thickness to exhibit excellent fire retardancy, which results in the increase of the product weight. Moreover, when the thickness of the resin layer is increased, the deviation in heat transfer into the resin layer is increased, which causes the optical distortion, in which an object at the opposite side of the fire retardant glass is seen distorted by heterogeneous reaction of the resin layer.

U.S. Pat. No. 5,565,273 discloses a fire retardant glass assembly comprising an inorganic silicate hydrogel as a resin composition. Since the hydrogel used in this patent contains an inorganic material as a main component, the entire specific gravity is high. Moreover, since the glass assembly comprises a sealed insulating glass with several panes of glass, the weight of the product is increased. Furthermore, it is necessary to coat the glass surface with a separate compound to improve the adhesion with the glass. In addition, since the resin composition itself containing silicate as a main component itself has its intrinsic viscosity, it is difficult to inject the resin composition at normal pressure, and it will lengthen the time for degassing process. Additionally, since the storage stability at room temperature of the silicate solution before injection is low, it requires special handling and storage.

U.S. Pat. No. 6,379,825 discloses a method of forming a uniform and transparent fire-resistant glazing panel by partially drying a mixed solution of a silicate resin compound used as a fire retardant material, applying the resulting solution on the glass surface, and applying heat and pressure to the glass surface. However, the manufacturing processes such as the drying process and insulating process are complex and, since the resin layer has low water content and small thickness, it can show the fire retardant function only when it is composed of several resin layers and several panes of glass.

Therefore, it is necessary to develop a fire retardant material having excellent physicochemical properties such as long-term durability and weather resistance as well as the properties required for the fire retardant glass such as long-term transparency, flame-retardant performance, and thermal insulation performance, and a method of manufacturing a fire retardant glass assembly using the same by a simplified process.

SUMMARY OF THE INVENTION

The present invention has been made in an effort to solve the above-described problems associated with prior art, and an object of the present invention is to provide an organic-inorganic hybrid transparent hydrogel complex, which can be suitably used as a fire retardant material for fire retardant glass due to its excellent properties such as long-term transparency, flame-retardant performance, thermal insulation performance, long-term durability, and weather resistance, a fire retardant glass assembly using the same, and a manufacturing method thereof.

In one aspect, the present invention provides an organic-inorganic hybrid transparent hydrogel complex for fire retardant glass, the complex comprising: 3 to 10 wt % of polymerizable acrylic monomer; 1 to 10 wt % of metal alkoxide sol solution; 5 to 30 wt % of water-soluble salt; 0.5 to 5 wt % of phosphorus compound; 0.01 to 0.2 wt % of silane coupling agent; 0.5 to 3 wt % of quaternary ammonium salt; 0.01 to 1 wt % of polymerization initiator; and 40 to 85 wt % of water.

In another aspect, the present invention provides a fire retardant glass assembly comprising the organic-inorganic hybrid transparent hydrogel complex as a fire retardant material.

In still another aspect, the present invention provides a method of manufacturing a fire retardant glass assembly using the organic-inorganic hybrid transparent hydrogel complex.

DETAILED DESCRIPTION OF THE INVENTION

Hereinafter, preferred embodiments of the present invention will be described in detail with reference to the accompanying drawings.

The present invention provides an organic-inorganic hybrid transparent hydrogel complex comprising 3 to 10 wt % of polymerizable acrylic monomer, 1 to 10 wt % of metal alkoxide sol solution, 5 to 30 wt % of water-soluble salt, 0.5 to 5 wt % of phosphorus compound, 0.01 to 0.2 wt % of silane coupling agent, 0.5 to 3 wt % of quaternary ammonium salt, 0.01 to 1 wt % of polymerization initiator, and 40 to 85 wt % of water.

As the polymerizable acrylic monomer used in the present invention, any acrylic monomers which are applicable to a fire retardant composition can be used without limitation. Examples of the polymerizable acrylic monomer may include, but not limited to, at least one selected from the group consisting of acrylamide, methacrylamide, N-methylacrylamide, N,N-dimethylacrylamide, N-methylolacrylamide, diacetoneacrylamide, N-methoxymethylacrylamide, N-n-butoxymethylacrylamide, N-isobutoxymethylacrylamide, tert-butylacrylamide sulfonic acid, tert-butylacrylamide, dimethylaminopropylmethacrylamide, N-isobutoxymethylmethacrylamide, and N-ethoxymethylmethacrylamide.

Preferably, the polymerizable acrylic monomer used in the present invention may be contained in an amount of 3 to 10 wt % with respect to the total weight of the complex. If the amount is less than 3 wt %, it is difficult to maintain the state of the hydrogel due to its low gel strength, and thus the adhesion between gel and glass is reduced. Whereas, if it exceeds 10 wt %, the strength of the hydrogel is increased, however, it is easily cracked by impact or heat. Moreover, there occurs haze in the gel to cause optical distortion.

In the present invention, examples of the metal alkoxide may include, but not limited to, at least one selected from the group consisting of tetramethoxysilane, tetraethoxysilane, titanium propoxide, titanium methoxide, aluminum isopropoxide, and aluminum triethoxide.

In the present invention, the metal alkoxide sol solution is prepared by homogeneously mixing 10 to 40 wt % of metal alkoxide, 50 to 80 wt % of water, and 0.1 to 10 wt % of catalyst. Here, the catalyst may be phosphoric acid.

Preferably, the metal alkoxide sol solution used in the present invention may be contained in an amount of 1 to 10 wt % with respect to the total weight of the complex. If the amount is less than 1 wt %, the effect of increasing the fire retardancy is not achieved, whereas, if it exceeds 10 wt %, the gel strength is very high, which rather reduces the fire retardancy.

In the present invention, examples of the water-soluble salt include, but not limited to, at least one selected from the group consisting of magnesium chloride, potassium chloride, calcium chloride, sodium chloride, and barium chloride.

Preferably, the water-soluble salt used in the present invention may be contained in an amount of 5 to 30 wt % with respect to the total weight of the complex. If the amount is less than 5 wt %, the fire retardancy is reduced, whereas, if it exceeds 30 wt %, the transparency of the hydrogel is reduced. The water-soluble salt does not have a significant effect on the reaction rate but delays the combustion time and serves to maintain the shape of a charred layer formed during combustion.

The phosphorus compound used in the present invention serves as a flame-retardant agent for reducing the flammability and improving the intumescent property and controls the reaction time and gel strength of the resin composition. When a predetermined amount of the polymerizable acrylic monomer is used together with a crosslinking agent, the properties such as the gel strength are increased, but a haze occurs in the gel to cause optical distortion. Since the chemical reaction takes place by heat in the resin composition as a fire retardant material of the fire retardant glass assembly, it is difficult to reduce the difference in reaction temperature between the inside and outside of the resin composition, and thus it is necessary to pay special attention to the reaction conditions so as to achieve homogeneous reaction in the resin composition. Especially, the phosphorus compound has a considerable effect on the homogeneous reaction of the resin composition as well as the reaction temperature and time. That is, the phosphorus compound delays the reaction time and controls the strength of the resin composition after reaction. With the use of the phosphorus compound, it is possible to manufacture a resin composition which does not cause the haze, which is locally observed, and the optical distortion, in which an object at the opposite side of the fire retardant glass is seen as distorted.

In the present invention, examples of the phosphorus compound may include, but not limited to, at least one selected from the group consisting of triethyl phosphate, diphenyl phosphate, tricresyl phosphate, cyclic phosphate, 2-methacryloylethyl phosphate, ethylene glycol methacrylate phosphate, guanidine phosphate, and phosphoric acid.

Preferably, the phosphorus compound used in the present invention may be contained in an amount of 0.5 to 5 wt % with respect to the total weight of the complex. If the amount is less than 0.5 wt %, the fire retardancy is reduced, whereas, if it exceeds 5 wt %, the transparency of the hydrogel is reduced.

The silane coupling agent used in the present invention serves to increase the adhesion between glass and gel. In the present invention, examples of the silane coupling agent may include, but not limited to, at least one selected from the group consisting of vinyltrimethoxysilane, vinyltriethoxysilane, Y-methacryloxypropyl methyltriethoxysilane, Y-methacryloxypropyl trimethoxy silane, Y-methacryloxypropyl triethoxy silane, Y-aminopropyl methyl dimethoxysilane, N-β (aminoethyl)-Y-aminopropyl methyl dimethoxysilane, N-β (aminoethyl)-Y-aminopropyl methyl diethoxysilane, and Y-mercaptopropyl trimethoxysilane.

Preferably, the silane coupling agent used in the present invention may be contained in an amount of 0.01 to 0.2 wt % with respect to the total weight of the complex. If the amount is less than 0.01 wt %, the adhesion between glass and gel is low, and thus an empty space between the glass and gel is created by external impact, which in turn reduces the transparency and fire retardancy of the fire retardant glass, whereas, if it exceeds 0.2 wt %, the compatibility with the hydrogel solution is low to reduce the transparency of the hydrogel.

The quaternary ammonium salt used in the present invention serves to increase the transparency of the hydrogel at low temperature. In the present invention, examples of the quaternary ammonium salt may include, but not limited to, at least one selected from the group consisting of tetrabutylammonium bromide, tetrabutylammonium chloride, and tetrabutylammonium hydroxide.

Preferably, the quaternary ammonium salt used in the present invention may be contained in an amount of 0.5 to 3 wt % with respect to the total weight of the complex. If the amount is less than 0.5 wt %, the frozen stability at low temperature is reduced, whereas, if it exceeds 3 wt %, the effect of increasing the transparency is not further increased.

The polymerization initiator used in the present invention allows the complex composition to become a gel through a reaction. In the present invention, examples of the polymerization initiator may include, but not limited to, at least one selected from the group consisting of sodium persulfate, potassium persulfate, and ammonium persulfate. Preferably, the polymerization initiator used in the present invention may be contained in an amount of 0.01 to 1 wt % with respect to the total weight of the complex.

At least one crosslinking agent or catalyst may be further contained in the hydrogel complex according to the present invention to improve the performance.

An example of the crosslinking agent may be N,N-methylenebisacrylamide. Examples of the catalyst may include, but not limited to, at least one selected from the group consisting of dimethylaminopropionitrile, diethylaminopropionitrile, and triethanolamine.

A fire retardant glass assembly is manufactured using the organic-inorganic hybrid transparent hydrogel complex according to the present invention.

The fire retardant glass assembly is manufactured in such a manner that the organic-inorganic hybrid transparent hydrogel complex is injected into an empty space of the assembly composed of two to five panes of fire retardant glass and the resulting assembly is sealed and subjected to a reaction at a temperature of 35° C. to 90° C. so that the complex becomes a gel.

Preferably, the fire retardant glass may be composed of two to five panes of tempered glass, more preferably, three panes of tempered glass.

The tempered glass located at the outermost end, which is exposed to sunlight, may be low-E glass, of which one surface is coated with a metal oxide. The low-E glass is formed by coating the surface of ordinary glass or tempered glass with a metal having high long-wavelength reflectance (such as silver or tin compound) to minimize the heat transfer between the interior and exterior.

When the low-E glass is used as the tempered glass located at the outermost end of the fire retardant glass assembly according to the present invention, it is possible to improve the long-term stability of the fire retardant material compared to the case where the ordinary glass is used. In the case where the low-E glass is located at the outermost end, it is preferred that the metal coated surface is directed to the outside. Since the low-E glass has an emissivity lower than the ordinary glass and has sufficient transparency, the infrared cut-off effect is high, and thus it serves to protect a resin layer interposed between glass plates. That is, in the case where the ordinary glass is used, when it is exposed to the outside for a long time, the resin layer may be deformed and discolored. However, when the low-E glass is used, this problem can be solved.

In the present invention, the tempered glass located at the outermost end of the fire retardant glass assembly may have a thickness of 3 to 6 mm, and the tempered glass located at the inside may have a thickness of 3 to 6 mm. If the thickness is smaller than the above range, the physical strength may be reduced, whereas, if it is grater than the above range, the weight may be significantly increased.

In the present invention, the space where the organic-inorganic hybrid transparent hydrogel complex is filled may have a thickness of 1 to 12 mm. If the thickness is smaller than the above range, the physical strength and the fire retardancy may be reduced, whereas, if it is greater than the above range, the weight may be significantly increased.

The fire retardant principle of the fire retardant glass assembly using the organic-inorganic hybrid transparent hydrogel complex according to the present invention will be described in detail below.

In a preferred embodiment of the present invention, the fire retardant glass assembly is composed of three panes of tempered glass including the low-E glass. The tempered glass located in the middle of the assembly serves as a heat barrier, which cuts off flame or heat, together with a charred layer formed during combustion of the resin composition as the fire retardant material. During combustion, a carbonization reaction takes place on the surface of the resin composition such that the charred layer is covered on the surface of glass. Therefore, the charred layer prevents the heat transfer to the interior to delay or prevent the interior from thermally decomposing. The fire retardant glass assembly is burned by fire as follows. The first glass, which is in contact with the heating surface, is the low-E glass, which is to be separated from the first resin composition, broken and collapsed during combustion. The reason for this is that the glass is exposed to excessive heat for a short period of time. Then, the first resin composition layer burns slowly, and only the thickness of the remaining ashes is reduced while maintaining the char formation. The reason that only the thickness of the resin composition is reduced while maintaining its shape during combustion is related to the components of the resin composition as the fire retardant material. As the high-temperature heat is continuously applied to the resin composition, the resin composition remains in the form of ashes to form a charred layer. The charred layer is attached to the second tempered glass to prevent the second tempered glass from being in direct contact with heat or flame. If the charred layer is too thin, the second glass is directly exposed to heat or flame, and thus it is broken and collapsed in the same manner as the first glass. Then, the heat or flame is directly applied to the second resin composition, and thus the temperature of the unexposed surface is increased above a predetermined value. As the charred layer formed by the first resin composition during combustion and the second tempered glass serve as a heat insulating layer, the heat applied to the second resin composition layer is reduced, and thus the temperature of the unexposed surface is reduced below a predetermined value. When the plate glass, not the tempered glass, is used as the intermediate glass of the fire retardant glass assembly, the plate glass is easily broken due to its heat-sensitive properties, although there is a charred layer having a predetermined thickness. With the use of the tempered glass in the fire retardant glass assembly according to the present invention, it is possible to reduce the thickness of the resin composition layer as the fire retardant material, and thus it is possible to reduce the weight of the product. The thickness of the first resin composition layer is in the range of 8 to 12 mm, for example, and the thickness of the second resin composition layer is in the range of 6 to 8 mm, for example. That is, the fire retardant glass assembly composed of a pane of low-E glass and two panes of tempered glass according to the present invention has excellent weather resistance and fire retardancy.

The fire retardant material of the fire retardant glass assembly according to the present invention is composed of an organic-inorganic hybrid transparent hydrogel complex and exhibits excellent transparency like glass and thermal insulation performance. The organic-inorganic hybrid transparent hydrogel complex comprises a metal alkoxide sol solution, an acrylic resin, a water-soluble salt, a phosphorus compound, a silane coupling agent, a quaternary ammonium salt, a polymerization initiator, and water. With the use of the organic-inorganic hybrid transparent hydrogel complex mixed with the metal alkoxide sol solution prepared by a sol-gel process and the acrylic resin, the fire retardancy of the fire retardant glass assembly is improved. Moreover, with the appropriate use of the phosphorus compound, it is possible to manufacture a resin composition having basic properties of the hydrogel required by the fire retardant glass assembly, such as gel strength, adhesion between glass and gel, and transparency like glass without optical distortion.

The hydrogel complex according to the present invention has excellent transparency at −20° C. to 80° C. and does not freeze below −20° C. Moreover, it maintains appropriate adhesion with glass so that no bubbles are generated between the glass and the resin composition layer. Furthermore, it is separated from the glass in the event of a fire to maintain the shape of gel, thus providing excellent fire retardancy. Since it is possible to manufacture the organic hybrid transparent hydrogel complex regardless of the thickness and shape of the space, it can be applied to an assembly which requires transparency as in transparent glass or plastic and can be further used as a filling material for wooden or iron fire doors or for fire retardant assemblies. As such, the organic-inorganic hybrid transparent hydrogel complex according to the present invention can be suitably used as a fire retardant material for interior and exterior fire retardant assemblies, which is injectable and can provide the fire retardancy.

The present invention will be described in more detail with reference to Examples. However, these examples are provided for illustrative purposes only, and the scope of the present invention is not limited to or by these examples.

EXAMPLES

As used in the following Examples and Comparative Examples, "%" or "percent" means the weight percent of the particular compound in the composition being described unless otherwise indicated or clear from the context of the description.

Example 1

A first mixed solution was prepared by placing 66% of water, 7% of sodium chloride, 2% of potassium chloride, 8% of magnesium chloride, 1.5% of triethyl phosphate, 1% of phosphoric acid, and 1% of tetramethyl ammonium chloride in a reaction vessel to be dissolved, and adding 5% acrylamide, 1% of N-methylolacrylamide, 0.1% of methacryloxypropyl methoxysilane, 0.02% of sodium persulfate, and 0.05% of N,N-methylenebisacrylamide to the resulting solution. An alkoxy silane sol solution was prepared by mixing 25% of tetraethoxysilane and 5% of phosphoric acid with 70% of water. 7.33% alkoxy sol solution was added to the first mixed solution and stirred for about 1 hour to prepare an organic-inorganic hybrid transparent hydrogel complex solution. Thus prepared solution was degassed under reduced pressure, and the resulting solution was injected into the inside of glass and placed in an oven at 80° C. to be subjected to polymerization and gellation reactions.

Example 2

A first mixed solution was prepared by placing 67% of water, 7% of sodium chloride, 10% of magnesium chloride, 1.5% of triethyl phosphate, and 1% of tetramethyl ammonium chloride in a reaction vessel to be dissolved, and adding 5% of acrylamide, 1% of N-methylolacrylamide, 0.1% of methacryloxypropyl methoxysilane, 0.02% of sodium persulfate, and 0.05% of N,N-methylenebisacrylamide to the resulting solution. An alkoxy silane sol solution was prepared by mixing 20% of tetraethoxysilane and 5% of phosphoric acid with 75% of water. 7.33% of alkoxy sol solution was added to the first mixed solution and stirred for about 1 hour to prepare an organic-inorganic hybrid transparent hydrogel complex solution. Thus prepared solution was degassed under reduced pressure, and the resulting solution was injected into the inside of glass and placed in an oven at 80° C. to be subjected to polymerization and gellation reactions.

Comparative Example 1

A mixed solution was prepared by placing 74.33% of water, 7% sodium chloride, 2% of potassium chloride, 8% of magnesium chloride, 1.5% of triethyl phosphate, and 1% of tetramethyl ammonium chloride in a reaction vessel to be dissolved, and adding 5% of acrylamide, 1% of N-methylolacrylamide, 0.1% of methacryloxypropyl methoxysilane, 0.02% of sodium persulfate, and 0.05% of N,N-methylenebisacrylamide to the resulting solution. The thus prepared mixed solution was degassed under reduced pressure, and the resulting solution was injected into the inside of glass and placed in an oven at 80° C. to be subjected to polymerization and gellation reactions.

Comparative Example 2

A first mixed solution was prepared by placing 69% of water, 7% of sodium chloride, 2% of potassium chloride, 8% magnesium chloride, and 1% tetramethyl ammonium chloride in a reaction vessel to be dissolved, and adding 5% of acrylamide, 1% of N-methylolacrylamide, 0.1% of methacryloxypropyl methoxysilane, 0.02% of sodium persulfate, and 0.05% of N,N-methylenebisacrylamide to the resulting solution. An alkoxy silane sol solution was prepared by mixing 25% of tetraethoxysilane and 5% of phosphoric acid with 70% of water. 5.3% of alkoxy sol solution was added to the first mixed solution and stirred for about 1 hour to prepare an organic-inorganic hybrid transparent hydrogel complex solution. Thus prepared solution was degassed under reduced pressure, and the resulting solution was injected into the inside of glass and placed in an oven at 80° C. to be subjected to polymerization and gellation reactions.

Performance Evaluation (1) Fire Test

The fire test was performed to evaluate the heat resistance of the organic-inorganic hybrid transparent hydrogel complexes prepared in the Examples and Comparative Examples, and the test results are shown in the following table 1. The size of the fire retardant glass assembly for the fire test was 1,700 mm (length)×900 mm (width), a triple glazing unit was prepared using a pane of low-E glass having a thickness of 6 mm and two panes of tempered glass having a thickness of 5 mm, and the thickness of the entire glass window was 34 mm. The fire retardancy of the test specimen by the fire test and the measurement results of the average and maximum temperature rise of the unexposed surface for the measurement of thermal insulation performance are shown in the following table 1. The fire test was performed in accordance with the Fire Test Procedures Code (IMO Res. A. 754(18), 1993) with respect to fire class A-60 glass for 60 minutes. Standards for the evaluation of the thermal insulation performance include the average temperature rise of the unexposed surface and the maximum temperature rise of the unexposed surface. Moreover the average temperature rise of the unexposed face should not be more than 140° C., and the temperature rise recorded by any of individual unexposed face thermocouples should not be more than 180° C. during the periods given. Each test was performed for 60 minutes, and in case when flame was exposed to the unexposed surface due to the damage of glass, the test was immediately stopped.

TABLE 1

| Fire test results | | | | |
|---|---|---|---|---|
| Unexposed face temperature rise | Example 1 | Example 2 | Comparative Example 1 | Comparative Example 2 |
| Fire retardancy (Duration: minute) | 60 | 60 | 55 | 50 |
| Average unexposed face temperature rise (Reference: below 140° C.) | 83° C. | 100° C. | 120° C. | 204° C. |
| Maximum unexposed face temperature rise (Reference: below 180° C.) | 101° C. | 104° C. | 203° C. | 507° C. |

As a result of the fire test for the Examples and the Comparative Examples, the average increase in temperature of the unexposed surface and the maximum increase in temperature of the unexposed surface according to Examples 1 and 2 were measured below the test standards, respectively, which satisfied the class A-60 fire retardant window test standards. In the fire test for Comparative Example 1, the maximum increase in temperature of the unexposed surface was measured as 203° C. at 55 minutes of time passage, which exceeded the reference temperature of 140° C. In the fire test for Comparative Example 2, the average and maximum increased in temperature of the unexposed surface were measured above the reference values at 50 minutes of time passage.

(2) Durability Evaluation

The durability of the fire retardant glass assembly comprising the organic-inorganic hybrid transparent hydrogel complex were evaluated in accordance with ISO-12543-4 (Glass in building—Laminated glass and laminated safety glass). High-temperature test, humidity test, and radiation test were performed to evaluate the durability. The test method and results are shown in the following table 2. The size of the test specimen was 300 mm×300 mm.

TABLE 2

| Type of test | Test method | Evaluation items | Results |
|---|---|---|---|
| High-temperature test | Test specimen is heated to 100° C., maintained thereat for 2 hours and then cooled to room temperature. | Presence of faults (Crack, Bubble, Discoloration, Delamination between glass and gel, Cloudiness, etc.) shall be observed in the test specimens | No change |
| Humidity test | Test specimen is placed in a climate chamber kept at 50° C. with. relative humidity of 80% for 14 days. | | No Change |
| Radiation test | Test specimen is mounted vertically in front of the radiation array in a radiation test apparatus. It is then exposed at 45 ± 5° C. for 2000 hours. | | No Change |

Separately from the fire test, the high-temperature properties, humidity properties, and radiation properties were observed to evaluate the durability and weather resistance of the fire retardant glass according to Examples 1 and 2. As a result of the observation, it was evaluated that there was no change in the fire retardant glass products before and after the test.

(3) Low-Temperature Test

The low-temperature test was performed to measure the temperature at which the transparent state of the resin layer inside the fire retardant glass was maintained. A fire retardant glass assembly with a single glazing unit and a fire retardant glass assembly with a double glazing unit were manufactured and placed in a low-temperature chamber cooled to −65° C. One surface of each sample was directed to the interior of the low-temperature chamber and the other surface was directed to the outside at room temperature. The test was performed on the test specimen according to Example 1, and the size of the test specimen was 550 mm (length)×850 mm (width). The transparent state of the fire retardant glass assembly with the single glazing unit was maintained up to −20.3° C., and that of the fire retardant glass assembly with the double glazing unit was maintained up to −60° C.

(4) Vibration Test

The vibration test was performed to evaluate the adhesion between the resin layer inside the fire retardant glass and the glass in accordance with the U.S. NAVY MIL-STD-167-1, Mechanical Vibrations of Shipboard Equipment (Type I, Environmental Vibration). The test was performed on the samples according to Example 1, and the size of the test specimen was 550 mm (length)×850 mm (width). As a result of the vibration test, there occurred no separation between the glass and the resin layer over the entire area.

As described above, the fire retardant glass assembly is composed of three panes of tempered glass, and the empty space between the glasses corresponds to a fire retardant material layer filled in a fire retardant material. The fire retardant material is an organic-inorganic hybrid transparent hydrogel complex obtained by gelating a compound comprising a polymerizable acrylic monomer, a metal alkoxide sol solution, a water-soluble salt, a phosphorus compound, a silane coupling agent, a quaternary ammonium salt, a polymerization initiator, and water. As a result of the evaluation of the manufactured fire retardant glass, it met the 60 minute fire retardancy, and thus it was confirmed that it can be suitably used as a resin material for the resin for fire retardant glass. During the high-temperature test, humidity test, and radiation test, it was confirmed that the original state of the sample was maintained. During the vibration test, it was confirmed that the adhesion between the glass and the resin layer was excellent. Moreover, during the low-temperature test, it exhibited excellent results, and thus it was confirmed that it can be effectively applied to the fire retardant glass assembly.

As above, preferred embodiments of the present invention have been described and illustrated, however, the present invention is not limited thereto, rather, it should be understood that various modifications and variations of the present invention can be made thereto by those skilled in the art without departing from the spirit and the technical scope of the present invention as defined by the appended claims.

What is claimed is:

1. An organic-inorganic hybrid transparent hydrogel complex for fire retardant glass, the complex comprising:
   3 to 10 wt % of polymerizable acrylic monomer;
   1 to 10 wt % of metal alkoxide sol solution;
   5 to 30 wt % of water-soluble salt;
   0.5 to 5 wt % of phosphorus compound;
   0.01 to 0.2 wt % of silane coupling agent;
   0.5 to 3 wt % of quaternary ammonium salt;
   0.01 to 1 wt % of polymerization initiator; and
   40 to 85 wt % of water.

2. The organic-inorganic hybrid transparent hydrogel complex of claim 1, wherein the polymerizable acrylic monomer comprises at least one selected from the group consisting of acrylamide, methacrylamide, N-methylacrylamide, N,N-dimethylacrylamide, N-methylolacrylamide, diacetoneacrylamide, N-methoxymethylacrylamide, N-n-butoxymethylacrylamide, N-isobutoxymethylacrylamide, tert-butylacrylamide sulfonic acid, tert-butylacrylamide, dimethylaminopropylmethacrylamide, N-isobutoxymethylmethacrylamide, and N-ethoxymethylmethacrylamide.

3. The organic-inorganic hybrid transparent hydrogel complex of claim 1, wherein the metal alkoxide is at least one selected from the group consisting of tetramethoxysilane, tetraethoxysilane, titanium propoxide, titanium methoxide, aluminum isopropoxide, and aluminum triethoxide.

4. The organic-inorganic hybrid transparent hydrogel complex of claim 1, wherein the metal alkoxide sol solution comprises 10 to 40 wt % of metal alkoxide, 50 to 80 wt % water, and 0.1 to 10 wt % of catalyst.

5. The organic-inorganic hybrid transparent hydrogel complex of claim 1, wherein the water-soluble salt is at least one selected from the group consisting of magnesium chloride, potassium chloride, calcium chloride, sodium chloride, and barium chloride.

6. The organic-inorganic hybrid transparent hydrogel complex of claim 1, wherein the phosphorus compound is at least one selected from the group consisting of triethyl phosphate, diphenyl phosphate, tricresyl phosphate, cyclic phosphate, 2-methacryloylethyl phosphate, ethylene glycol methacrylate phosphate, guanidine phosphate, and phosphoric acid.

7. The organic-inorganic hybrid transparent hydrogel complex of claim 1, wherein the silane coupling agent is at least one selected from the group consisting of vinyltrimethoxysilane, vinyltriethoxysilane, Y-methacryloxypropyl methyltriethoxysilane, Y-methacryloxypropyl trimethoxy silane, Y-methacryloxypropyl triethoxy silane, Y-aminopropyl methyl dimethoxysilane, N-β(aminoethyl)-Y-aminopropyl methyl dimethoxysilane, N-β(aminoethyl)-Y-aminopropyl methyl diethoxysilane, and Y-mercaptopropyl trimethoxysilane.

8. The organic-inorganic hybrid transparent hydrogel complex of claim 1, wherein the quaternary ammonium salt is at least one selected from the group consisting of tetrabutylammonium bromide, tetrabutylammonium chloride, and tetrabutylammonium hydroxide.

9. The organic-inorganic hybrid transparent hydrogel complex of claim 1, wherein the polymerization initiator is at least one selected from the group consisting of sodium persulfate, potassium persulfate, and ammonium persulfate.

10. The organic-inorganic hybrid transparent hydrogel complex of claim 1, further comprising at least one crosslinking agent or catalyst.

11. The organic-inorganic hybrid transparent hydrogel complex of claim 10, wherein the crosslinking agent is N,N-methylenebisacrylamide.

12. The organic-inorganic hybrid transparent hydrogel complex of claim 10, wherein the catalyst is at least one selected from the group consisting of dimethylaminopropionitrile, diethylaminopropionitrile, and triethanolamine.

13. A fire retardant glass assembly comprising the organic-inorganic hybrid transparent hydrogel complex of claim 1.

14. The fire retardant glass assembly of claim 13, wherein the fire retardant glass comprises two to five panes of tempered glass and the organic-inorganic hybrid transparent hydrogel complex is filled in a space between the glasses.

15. The fire retardant glass assembly of claim 14, wherein the tempered glass located at the outermost end thereof is low-E glass, of which one surface is coated with a metal oxide.

16. The fire retardant glass assembly of claim 14, wherein the tempered glass located at the outermost end thereof has a thickness of 3 to 6 mm, and the tempered glass located at the inside has a thickness of 3 to 6 mm.

17. The fire retardant glass assembly of claim 14, wherein the space where the organic-inorganic hybrid transparent hydrogel complex is filled has a thickness of 1 to 12 mm.

18. A method of manufacturing a fire retardant glass assembly, comprising:
   injecting the organic-inorganic hybrid transparent hydrogel complex of claim 1 into an empty space of an assembly composed of two to five panes of tempered glass; and
   sealing and allowing the resulting assembly to be subjected to a reaction at a temperature of 35° C. to 90° C. so that the complex becomes a gel.

* * * * *